US012100888B2

(12) United States Patent
Liu et al.

(10) Patent No.: US 12,100,888 B2
(45) Date of Patent: Sep. 24, 2024

(54) PHASE SHIFTER ASSEMBLY AND BASE STATION ANTENNA

(71) Applicant: Outdoor Wireless Networks LLC, Claremont, NC (US)

(72) Inventors: Yabing Liu, Suzhou (CN); YueMin Li, Suzhou (CN); Junfeng Yu, Suzhou (CN); Long Shan, Suzhou (CN); Yan Wang, Suzhou (CN); Zelun Long, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

(21) Appl. No.: 17/822,876

(22) Filed: Aug. 29, 2022

(65) Prior Publication Data

US 2023/0127406 A1 Apr. 27, 2023

(30) Foreign Application Priority Data

Oct. 27, 2021 (CN) ......................... 202111253188.7

(51) Int. Cl.

| | |
|---|---|
| ***H01Q 1/24*** | (2006.01) |
| ***H01P 1/18*** | (2006.01) |
| ***H01Q 3/26*** | (2006.01) |
| ***H01Q 3/32*** | (2006.01) |

(52) U.S. Cl.

CPC ............. *H01Q 1/246* (2013.01); *H01P 1/184* (2013.01); *H01Q 3/2658* (2013.01); *H01Q 3/32* (2013.01)

(58) Field of Classification Search

CPC ........ H01Q 1/246; H01Q 3/2658; H01Q 3/32; H01P 1/184

See application file for complete search history.

(56) References Cited

U.S. PATENT DOCUMENTS

| | | | | |
|---|---|---|---|---|
| 2005/0134404 A1* | 6/2005 | Kajiya | H01Q 25/004 333/156 |
| 2018/0108990 A1* | 4/2018 | Xiao | H01P 1/18 |
| 2019/0326663 A1* | 10/2019 | Liu | H01Q 1/246 |
| 2020/0099139 A1* | 3/2020 | Rebegea | H01Q 15/14 |
| 2021/0151879 A1* | 5/2021 | Litteer | H01Q 3/32 |

FOREIGN PATENT DOCUMENTS

| | | | | |
|---|---|---|---|---|
| CN | 212113968 U * | 12/2020 | |
| JP | 2016178526 A | 10/2016 | |
| WO | WO-2020046550 A1 * | 3/2020 | H01Q 1/246 |

OTHER PUBLICATIONS

"Extended European Search Report corresponding to European Application No. 22202082.8 dated Mar. 24, 2023".

Chen, Zhi Ning, et al., "Arrays with Remotely Controlled Electrical Parameters", Antennas for Base Stations McGraw Hill, New York (Jan. 1, 2009) pp. 72-78.

* cited by examiner

*Primary Examiner* — Hoang V Nguyen
*Assistant Examiner* — Yonchan J Kim
(74) *Attorney, Agent, or Firm* — Myers Bigel, P.A.

(57) ABSTRACT

The present disclosure relates to a phase shifter assembly and a base station antenna, wherein the phase shifter assembly includes: a first printed circuit board; a first wiper arm, which is rotatably coupled to the first printed circuit board; a second printed circuit board; and a second wiper arm, which is rotatably coupled to the second printed circuit board; wherein the first printed circuit board and the second printed circuit board are arranged at a non-zero angle.

19 Claims, 5 Drawing Sheets

PHASE SHIFTER ASSEMBLY AND BASE STATION ANTENNA

RELATED APPLICATION

The present application claims priority to and the benefit of Chinese Patent Application No. 202111253188.7, filed Oct. 27, 2021, the disclosure of which is hereby incorporated herein by reference in full.

FIELD OF THE INVENTION

The present disclosure generally relates to the technical field of radio communication, and more particularly, to a phase shifter assembly and a base station antenna.

BACKGROUND OF THE INVENTION

Communication base stations are well known in the art, and generally include baseband units, radio devices, base station antennas and other components. Base station antennas are configured to provide bidirectional radio frequency ("RF") communication with stationary and mobile subscribers ("users") located throughout the cell. Generally, base station antennas may be installed on towers or raised structures such as poles, roofs, water towers, etc., and separate baseband units and radio equipment are connected to the base station antennas.

FIG. 1 is a schematic structural diagram of a conventional communication base station 60. The communication base station 60 includes a base station antenna 100 that can be mounted on a tower 30. The communication base station 60 may further include a baseband unit 40 and a radio device 42. In order to simplify the drawing, a single baseband unit 40 and a single radio device 42 are shown in FIG. 1. However, it should be understood that more than one baseband unit 40 and/or radio device 42 may be provided. In addition, although the radio device 42 is shown as being co-located with the baseband unit 40 at the bottom of the tower 30, it should be understood that in other cases, the radio device 42 may be a remote radio head mounted on the tower 30 adjacent to the base station antenna 100. The baseband unit 40 can receive data from another source, such as a backhaul network (not shown), and process the data and provide a data stream to the radio device 42. The radio device 42 can generate RF signals including data encoded therein and amplify and transmit these RF signals to the base station antenna 100 through a coaxial transmission line 44. It should also be understood that the communication base station 60 of FIG. 1 may generally include various other devices (not shown), such as a power supply, a backup battery, a power bus, an antenna interface signal group (AISG) controller, and the like. Generally, a communication base station may include one or more phased arrays of radiating elements, wherein the radiating elements are arranged in one or more columns when the base station antenna is installed for use.

In order to transmit and receive RF signals to and from a defined coverage area, the antenna beam of the base station antenna 100 is usually inclined at a certain downward angle with respect to the horizontal plane (referred to as a "downtilt"). In some cases, the base station antenna 100 may be designed so that the "electronic downtilt" of the base station antenna 100 can be adjusted from a remote location. With the base station antenna 100 including such an electronic tilt capability, the physical orientation of the base station antenna 100 is fixed, but the effective tilt of the antenna beam can still be adjusted electronically, for example, by controlling phase shifters that adjust the phases of signals provided to each radiating element of the base station antenna 100. The phase shifter and other related circuits are usually built in the base station antenna 100 and can be controlled from a remote location. Typically, an AISG control signal is used to control the phase shifter.

Many different types of phase shifters are known in the art, including rotary wiper arm phase shifters, trombone style phase shifters, sliding dielectric phase shifters, and sliding metal phase shifters. The phase shifter is usually constructed together with a power divider as a part of a feeding network (or feeder component) for feeding the phased array. The power divider divides the RF signal input to the feeding network into a plurality of sub-components, and the phase shifter applies a changeable corresponding phase shift to each sub-component so that each sub-component is fed to one or more radiators.

SUMMARY OF THE INVENTION

The objective of the present disclosure is to provide a phase shifter assembly and a base station antenna.

According to a first aspect of the present disclosure, a phase shifter assembly is provided, and the phase shifter assembly includes: a first printed circuit board; a first wiper arm, which is rotatably coupled to the first printed circuit board; a second printed circuit board; and a second wiper arm, which is rotatably coupled to the second printed circuit board; wherein the first printed circuit board and the second printed circuit board are arranged at a non-zero angle.

According to a second aspect of the present disclosure, a base station antenna is provided, and the base station antenna includes the phase shifter assembly as described above.

DESCRIPTION OF DRAWINGS

The attached drawings, which form a part of the specification, describe embodiments of the present disclosure and, together with the specification, are used to explain the principles of the present disclosure.

The present disclosure can be understood more clearly according to the following detailed description with reference to the drawings, in which.

Figure 1:
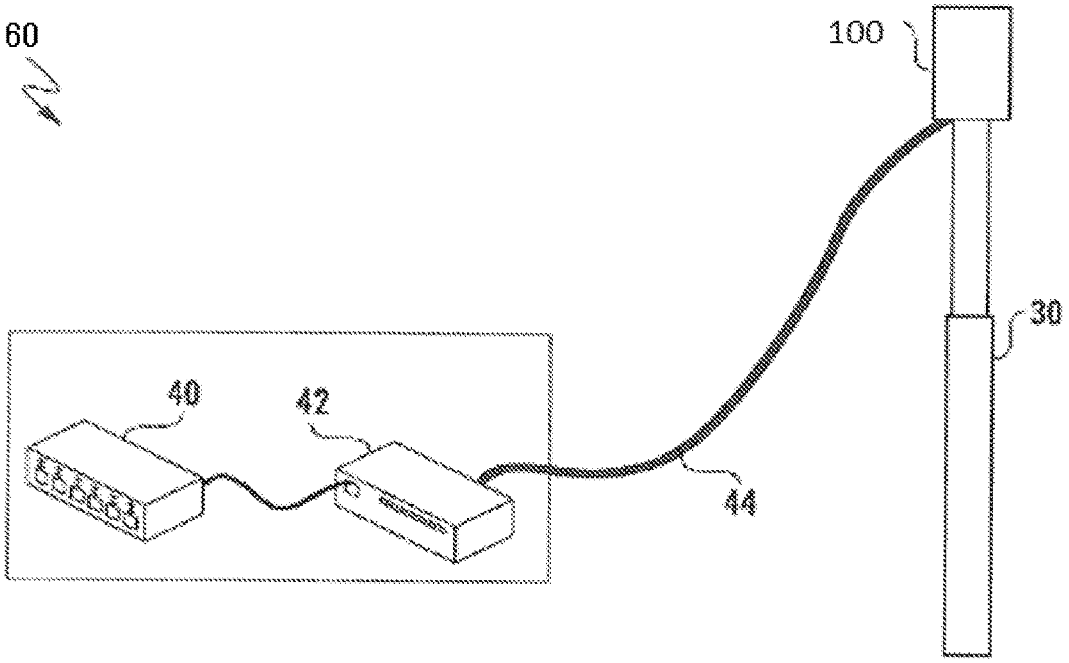
FIG. 1 is a schematic structural diagram of a communication base station.

Note that in the embodiments described below, the same signs are sometimes used in common between different drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the positions, dimensions, and ranges disclosed in the attached drawings and the like.

EMBODIMENTS OF THE INVENTION

Various exemplary embodiments of the present disclosure will be described in detail below by referencing the attached drawings. It should be noted: unless otherwise specifically stated, the relative arrangement, numerical expressions and numerical values of components and steps set forth in these embodiments do not limit the scope of the present disclosure.

The following description of at least one exemplary embodiment is actually only illustrative, and in no way serves as any limitation to the present disclosure and its application or use. In other words, the structure and method herein are shown in an exemplary manner to illustrate different embodiments of the structure and method in the present disclosure. Those of ordinary skill in the art should understand that these examples are merely illustrative, but not in an exhaustive manner, to indicate the embodiments of the present disclosure. In addition, the drawings are not necessarily drawn to scale, and some features may be enlarged to show details of some specific components.

The technologies, methods, and equipment known to those of ordinary skill in the art may not be discussed in detail, but where appropriate, the technologies, methods, and equipment should be regarded as part of the specification.

In all examples shown and discussed herein, any specific value should be construed as merely exemplary value and not as limitative value. Therefore, other examples of the exemplary embodiments may have different values.

Generally, a conventional rotary wiper arm phase shifter can be used in a low-band base station antenna. The rotary wiper arm phase shifter may include a printed circuit board arranged in parallel with a reflector of the base station antenna and a wiper arm rotatably coupled to the printed circuit board. Electric components, such as traces and pads, can be disposed on the wiper arm, for example, be included in a third printed circuit board of the wiper arm itself. And these electric components can be interact with the components on the printed circuit board of the rotary wiper arm phase shifter. As the position of the wiper arm changes relative to the printed circuit board, the phase shift of signals applied to radiating elements of the base station antenna can be changed. Such a phase shifter is convenient for installation and maintenance, and generally has a low cost. However, it also requires a large installation space and may have poor performance.

Therefore, it may be difficult for the rotary wiper arm phase shifter to meet the performance requirements in a high-band base station antenna. In order to improve the communication performance, a cavity phase shifter is required. In addition, if there are both low-band radiating elements and high-band radiating elements in the base station antenna, in order to meet the performance requirements of the high-band radiating elements and limited to the installation space in the base station antenna, the cavity phase shifter is usually used for both the low-band radiating elements and the high-band radiating elements, and this will lead to an increase in the cost of the base station antenna.

In order to solve the aforementioned problems, the present disclosure provides a phase shifter assembly and a base station antenna. The phase shifter assembly of the present disclosure can be arranged at an obtuse angle to the reflector of the base station antenna, and thus a certain space can be reserved for the installation of the cavity phase shifter. In this way, in a base station antenna including low-band radiating elements and high-band radiating elements, the phase shifter assembly and the cavity phase shifter described in detail below may be respectively used for different types of radiating elements to meet the requirements of different radiating elements, thereby reducing the cost of the base station antenna while ensuring the performance of the base station antenna.

Figure 2A:
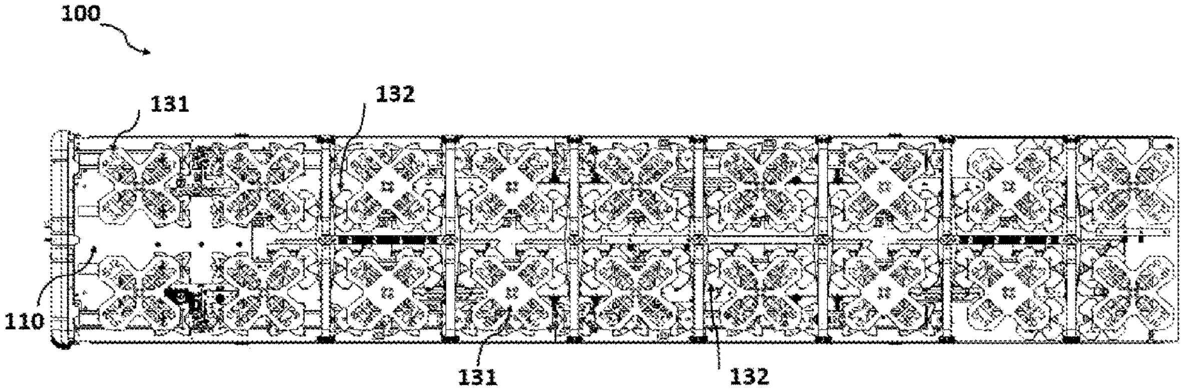
FIG. 2A is a front view of a base station antenna according to an exemplary embodiment of the present disclosure.
Figure 2B:
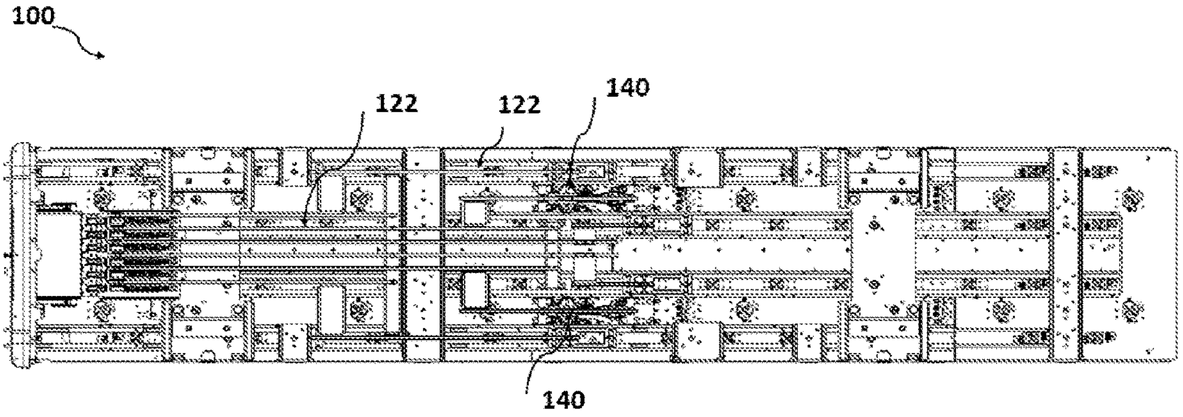
FIG. 2B is a rear view of a base station antenna according to an exemplary embodiment of the present disclosure.
Figure 2C:
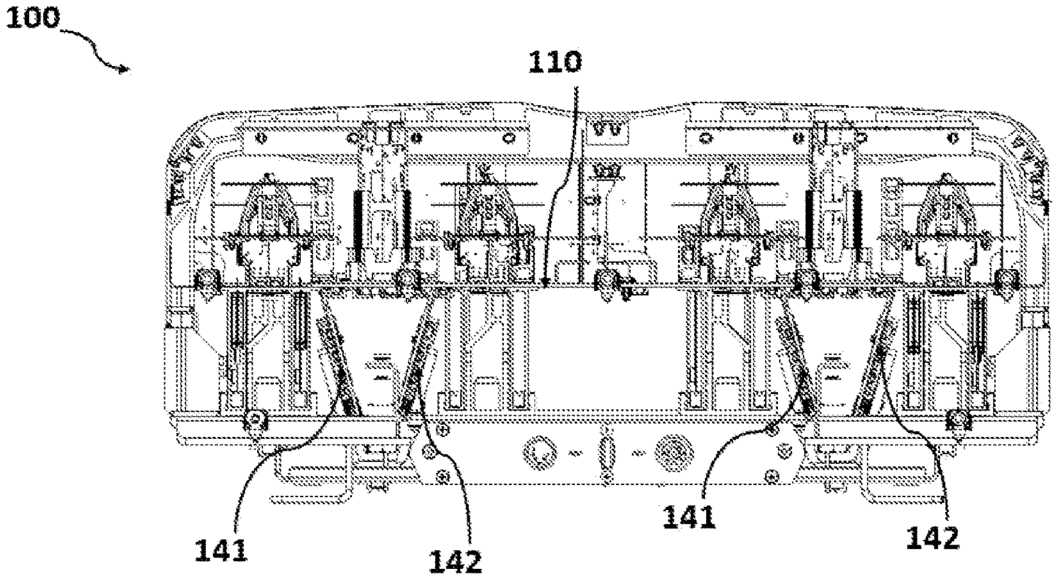
FIG. 2C is a cross-sectional view of a base station antenna according to an exemplary embodiment of the present disclosure.

FIGS. 2A to 2C are respectively a front view, a rear view, and a cross-sectional view of a base station antenna according to an exemplary embodiment of the present disclosure.

As shown in FIGS. 2A to 2C, a base station antenna 100 may include: a reflector 110; a plurality of low-band radiating elements 131 and a plurality of high-band radiating elements 132 arranged on the front side of the reflector 110; and a phase shifter assembly 140 and a cavity phase shifter 122 arranged on the rear side of the reflector 110. In the embodiment show in FIGS. 2A to 2C, the phase shifter assembly 140 may be used for the low-band radiating elements 131, and the cavity phase shifter 122 may be used for the high-band radiating elements 132.

In the present disclosure, the phase shifter assembly 140 may be arranged at an obtuse angle to the reflector 110 of the base station antenna 100 so as to reduce the projected area of the phase shifter assembly 140 on the reflector 110. This allows the base station antenna 100 to be made narrower, so that the wind load on the base station antenna 100 can be reduced. In addition, such a phase shifter assembly 140 can be used together with the cavity phase shifter 122, thereby achieving the free combination of low-band radiating elements and high-band radiating elements, so that the diversification of the functions of the base station antenna can be realized to better meet user requirements.

The structure of the phase shifter assembly 140 will be described in more detail below with reference to FIGS. 3 to 8.

Figure 3:
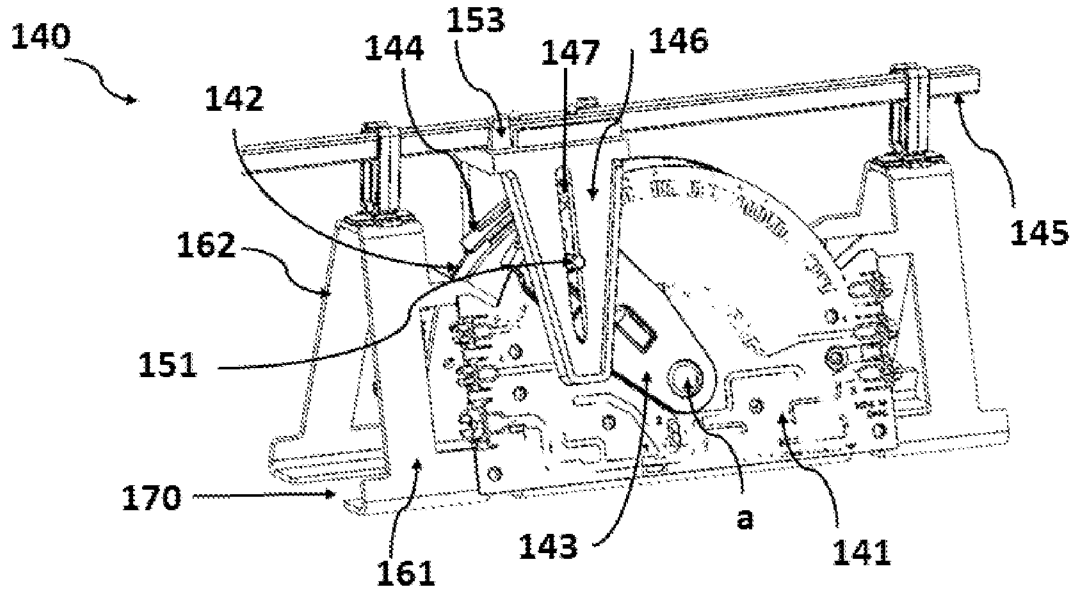
FIG. 3 is a perspective view of a phase shifter assembly according to an exemplary embodiment of the present disclosure.

FIG. 3 is a perspective view of a phase shifter assembly according to an exemplary embodiment of the present disclosure. The phase shifter assembly 140 may include a first printed circuit board 141, a first wiper arm 143, a second printed circuit board 142, and a second wiper arm 144. The first wiper arm 143 is coupled to the first printed circuit board 141 rotatably, for example, pivotally about a pivot axis a. Similarly, the second wiper arm 144 is coupled to the second printed circuit board 142 rotatably, for example, pivotally about a pivot axis that is the same as or different from the pivot axis a (such as the pivot axis b shown in FIG. 6). The first printed circuit board 141 and the second printed circuit board 142 are arranged at a non-zero angle. As the angle between the first printed circuit board 141 and the second printed circuit board 142 increases, the phase shifter assembly 121 may have better stability and more space for arranging components such as cables. However, the space occupied by the phase shifter assembly 121 increases correspondingly. In some embodiments, the angle between the first printed circuit board 141 and the second printed circuit board 142 may be an acute angle. Further, in some embodiments, the angle between the first printed circuit board 141 and the second printed circuit board 142 may be any angle that is not equal to 180°, for example, an angle of 5°, 30°, 45°, 60°, 80°, 150°, or an angle between two of them.

In order to drive the first wiper arm 143 and the second wiper arm 144 to rotate relative to the first printed circuit board 141 and the second printed circuit board 142 respectively so as to adjust the phase of signals applied to the radiating elements, the phase shifter assembly 140 may further include a drive rod. The drive rod may be coupled to a driving device such as an actuator (not shown in the drawings) in order to obtain driving force. There may be a plurality of ways of setting the drive rod in the phase shifter assembly 121.

In some embodiments, as shown in FIG. 3, the phase shifter assembly 140 may include a single first drive rod 145. The first drive rod 145 may be coupled to both the first wiper arm 143 and the second wiper arm 144, thereby driving the first wiper arm 143 and the second wiper arm 144 to rotate in unison.

In some embodiments, as shown in FIG. 3, the first drive rod 145 may be coupled to the first wiper arm 143 and the second wiper arm 144 through a first coupling element 146. For example, the first coupling element 146 may be bridged between the first wiper arm 143 and the second wiper arm 144 and coupled to the first drive rod 145. Specifically, the first wiper arm 143 may include a first additional connecting rod 151, the first coupling element 146 may include a first guide groove 147, and the first additional connecting rod 151 may be configured to be inserted into the first guide groove 147 and move along the first guide groove 147. Similarly, the second wiper arm 144 may include a second additional connecting rod, the first coupling element 146 may further include a second guide groove, and the second additional connecting rod may be configured to be inserted into the second guide groove and move along the second guide groove. In addition, the first coupling element 146 may further include a first locking portion 153, and the first locking portion 153 may be fixedly connected to the first drive rod 145. For example, the first locking portion 153 may be a closed loop or an open loop, and may be sleeved and fixed on the first drive rod 145. When the first drive rod 145 moves, the first coupling element 146 is driven to move accordingly, causing the first additional connecting rod 151 and the second additional connecting rod to slide in the first guide groove 147 and the second guide groove respectively, thereby changing the phase shift applied to the signals.

The first drive rod 145 may be arranged in different positions. For example, the first drive rod 145 may be arranged adjacent to a side where the first printed circuit board 141 and the second printed circuit board 142 are closer to each other, that is, located close to the imaginary vertex of the angle between the first printed circuit board 141 and the second printed circuit board 142.

In FIG. 3, the first drive rod 145 may be located above the top of the first circuit board 141 and the second printed circuit board 142.

Figure 6:
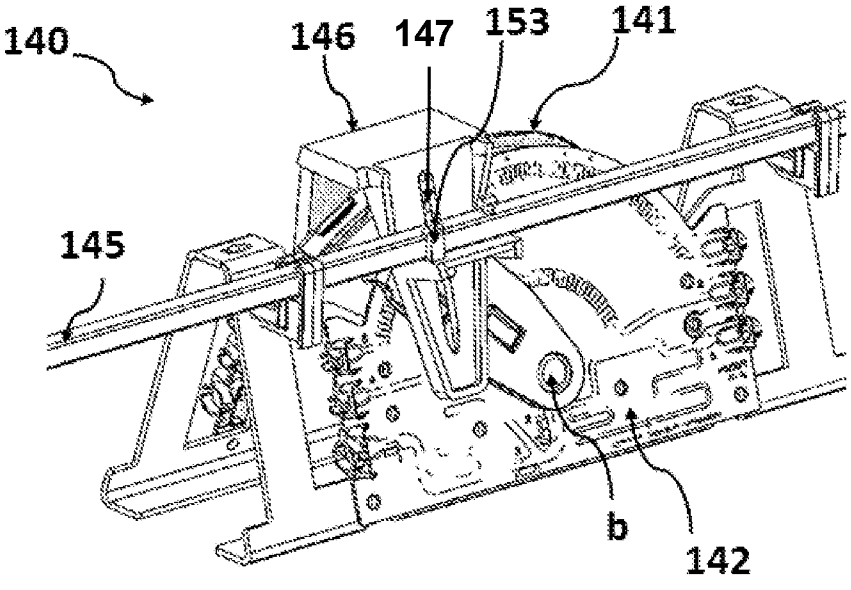
FIG. 6 is a perspective view of a phase shifter assembly according to another exemplary embodiment of the present disclosure.

In FIG. 6, the first drive rod 145 may be arranged on a side of the second printed circuit board 142 facing away from the first printed circuit board 141. Similarly, the first drive rod may also be arranged on a side of the first printed circuit board facing away from the second printed circuit board. Correspondingly, the first locking portion 153 of the first coupling element 146 may be arranged on a side closer to the first drive rod 145. Comparing with the embodiment shown in FIG. 3, the phase shifter assembly 140 in FIG. 6 may have a lower height.

Figure 7:
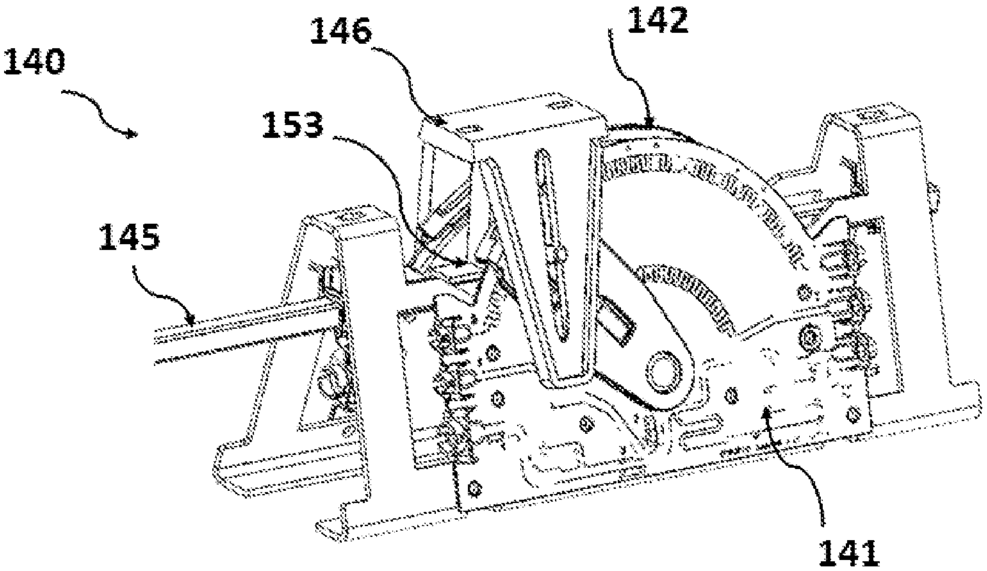
FIG. 7 is a perspective view of a phase shifter assembly according to a further exemplary embodiment of the present disclosure.

In FIG. 7, the first drive rod 145 may also be provided between the first circuit board 141 and the second printed circuit board 142. Correspondingly, the first locking portion 153 of the first coupling element 146 may be provided between the first circuit board 141 and the second printed circuit board 142. In order to reserve enough space for the first drive rod 145 and related components, the first circuit board 141 and the second printed circuit board 142 may be arranged to be spaced apart from each other. Comparing with the embodiments in FIGS. 2 and 6, the phase shifter assembly 140 according to the embodiment of FIG. 7 may have lower height and smaller size.

Figure 8:
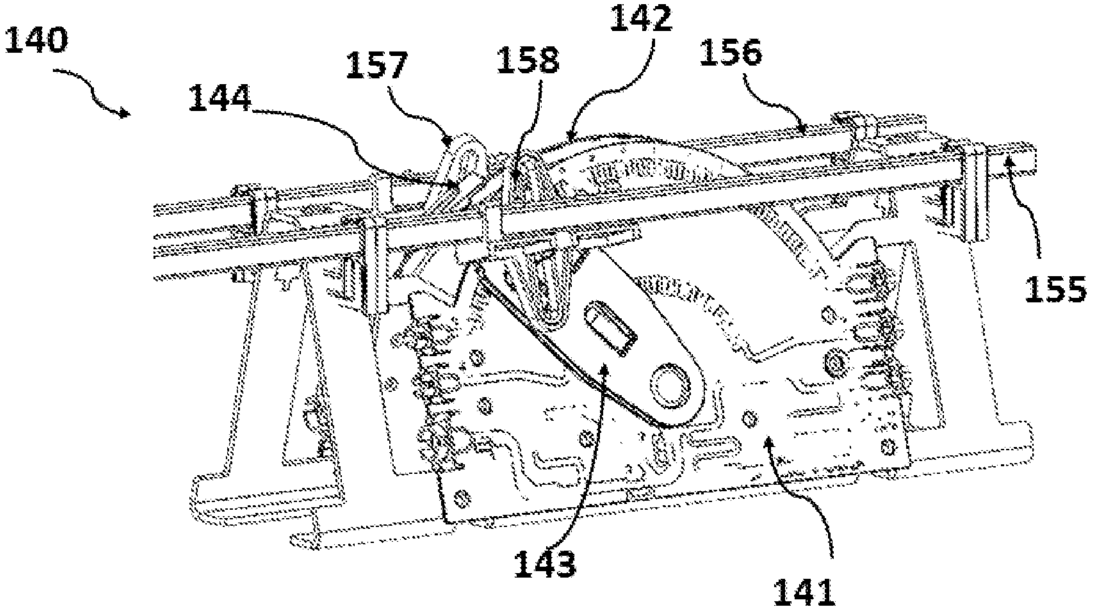
FIG. 8 is a perspective view of a phase shifter assembly according to still another exemplary embodiment of the present disclosure.

In some embodiments, as shown in FIG. 8, the phase shifter assembly 140 may include two drive rods, for example, a second drive rod 155 and a third drive rod 156. Here, the second drive rod 155 may be coupled to the first wiper arm 143 for driving the first wiper arm 143 to rotate, and the third drive rod 156 may be coupled to the second wiper arm 144 for driving the second wiper arm 144 to rotate. Here, the second drive rod 155 may be provided on a side of the first printed circuit board 141 facing away from the second printed circuit board 142 and coupled to the first wiper arm 143 through a separate second coupling element 157. Similarly, the third drive rod 156 may be provided on a side of the second printed circuit board 142 facing away from the first printed circuit board 141 and coupled to the second wiper arm 144 through a separate third coupling element 158. In some embodiments, the first wiper arm 143 and the second wiper arm 144 may be configured to rotate in unison. Alternatively, in some other embodiments, the first wiper arm 143 and the second wiper arm 144 may also be configured to rotate independently from each other to meet different use requirements. Similar to the embodiment in FIG. 3, as shown in FIG. 8, the first wiper arm 143 may include a third additional connecting rod, the second coupling element 157 may include a third guide groove, and the third additional connecting rod may be configured to be inserted into the third guide groove and move along the third guide groove. In addition, the second wiper arm 144 may include a fourth additional connecting rod, the third coupling element 158 may include a fourth guide groove, and the fourth additional connecting rod may be configured to be inserted into the fourth guide groove and move along the fourth guide groove. Similar to the embodiment in FIG. 3, as shown in FIG. 8, the second coupling element 157 may further include a second locking portion, and the second locking portion may be configured to be fixedly connected to the second drive rod 156 so as to fix the second coupling element 157 to the second drive rod 156. In addition, the third coupling element 158 may further include a third locking portion, and the third locking portion may be configured to be fixedly connected to the third drive rod 155 so as to fix the third coupling element 158 to the third drive rod 155.

In some embodiments, the phase shifter assembly 140 may be arranged substantially in mirror symmetry in order for the first wiper arm 143 and the second wiper arm 144 to be driven stably and in unison. For example, the phase shifter assembly 140 may be mirror-symmetrical about the plane between the first printed circuit board 141 and the second printed circuit board 142. Correspondingly, the first drive rod 145 may be provided on the symmetry plane between the first printed circuit board 141 and the second printed circuit board 142.

Figure 4:
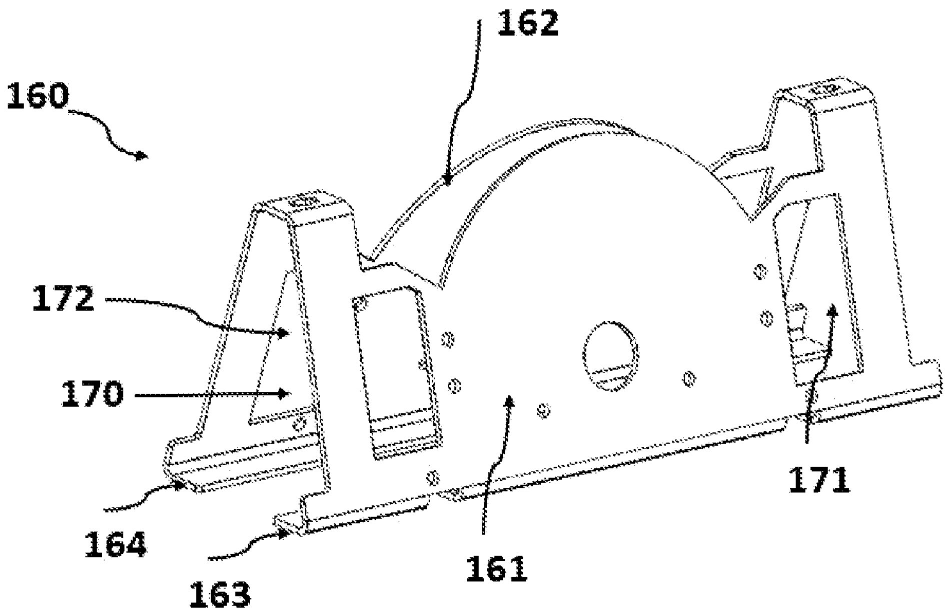
FIG. 4 is a perspective view of a bracket of a phase shifter assembly according to an exemplary embodiment of the present disclosure.
Figure 5:
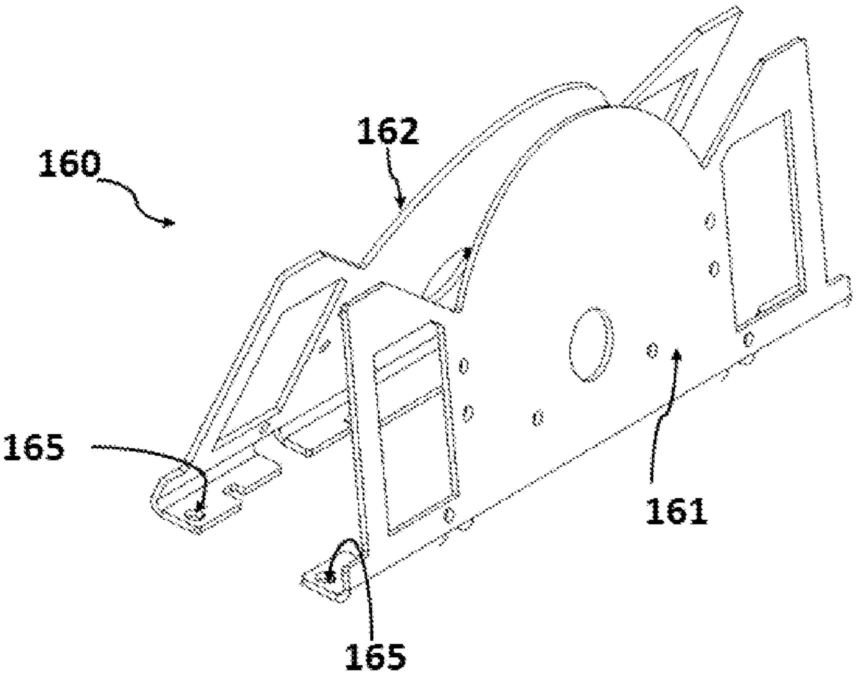
FIG. 5 is a perspective view of a bracket of a phase shifter assembly according to another exemplary embodiment of the present disclosure.

As shown in FIGS. 4 and 5, the phase shifter assembly 140 may further include a bracket 160 in order to better fix the first printed circuit board 141 and the second printed circuit board 142. The bracket 160 may include a first side portion 161 for fixing the first printed circuit board 141 and a second side portion 162 for fixing the second printed circuit board 142. The bracket 160 may be produced by punch forming or die-casting molding, and may be integrally formed, or may be formed by first forming components such as the first side portion 161 and the second side portion 162 respectively and then assembling.

Considering robustness, the first side portion 161 may be configured to have a contour substantially equal to that of the first printed circuit board 141, and similarly, the second side portion 162 may also be configured to have a contour substantially equal to that of the second printed circuit board 142. The first side portion 161 and the second side portion 162 may be arranged to be at an angle to each other, so that the first printed circuit board 141 and the second printed circuit board 142 mounted thereon are also at an angle to each other.

In some embodiments, as shown in FIG. 4, a first fixing portion 163 for fixing may be configured on one side of the first side portion 161, and a second fixing portion 164 for fixing may be configured on one side of the second side portion 162. A plurality of mounting holes 165 may be included on the first fixing portion 163 and the second fixing portion 164 to allow the first fixing portion 163 and the second fixing portion 164 to be respectively fixed to the reflector 110 of the base station antenna 100 with, for example, screws or rivets. In some embodiments, as shown in FIG. 4, the first fixing portion 163 and the second fixing portion 164 may extend toward each other. Alternatively, in some other embodiments, the first fixing portion 163 and the second fixing portion 164 may also be configured to extend away from each other.

In some embodiments, as shown in FIG. 4, the phase shifter assembly 140 may include a cable channel 170 limited between the first printed circuit board 141 and the second printed circuit board 142, and at least part of the cable may be accommodated in the cable channel 170 to facilitate wiring. As shown in FIG. 4, a first opening 171 may also be provided on the first side portion 161 so that the cable can extend from one side of the first side portion 161 to the other side through the first opening 171. Similarly, a second opening 172 may also be provided on the second side portion 162 so that the cable can extend from one side of the second side portion 162 to the other side of the second side portion 162 through the second opening 172. As a result, the cables can be guided, fixed and/or grouped in the phase shifter assembly 140 in an orderly manner.

The phase shifter assembly and the base station antenna of the present disclosure can bring at least one or more of the following advantages. First, the first printed circuit board and the second printed circuit board of the phase shifter assembly are arranged at a non-zero angle to each other and can be installed generally vertically on the reflector of the base station antenna. Therefore, the phase shifter assembly can occupy a smaller space, so that the base station antenna can be made narrower, thereby reducing the wind load of the base station antenna. Second, the phase shifter assembly of the present disclosure allows the free combination of low-band antenna elements and high-band antenna elements in the base station antenna, thereby achieving diversification of antenna functions and better meeting user needs. Third, the phase shifter assembly of the present disclosure can shorten the length of the required cable, thereby improving the electrical performance of the base station antenna and reducing the cost. Fourth, the installation of the phase shifter assembly of the present disclosure is simple and flexible, and automatic mechanical installation can be realized, which helps to reduce the cost of the base station antenna.

As used herein, the words “front”, “rear”, “top”, “bottom”, “above”, “below”, etc., if present, are used for descriptive purposes and are not necessarily used to describe constant relative positions. It should be understood that the terms used in this way are interchangeable under appropriate circumstances, so that the embodiments of the present disclosure described herein, for example, can be operated on other orientations that differ from those orientations shown herein or otherwise described.

As used herein, the word “exemplary” means “serving as an example, instance, or illustration” rather than as a “model” to be copied exactly. Any realization method described exemplarily herein is not necessarily interpreted as being preferable or advantageous over other realization methods. Furthermore, the present disclosure is not limited by any expressed or implied theory given in the above technical field, background art, summary of the invention or embodiments.

As used herein, the word “basically” means any minor changes including those caused by design or manufacturing defects, device or component tolerances, environmental influences, and/or other factors. The word “basically” also allows the gap from the perfect or ideal situation due to parasitic effects, noise, and other practical considerations that may be present in the actual realization.

In addition, the above description may have mentioned elements or nodes or features that are “connected” or “coupled” together. As used herein, unless explicitly stated otherwise, “connect” means that an element/node/feature is electrically, mechanically, logically, or in other manners connected (or communicated) with another element/node/feature. Similarly, unless explicitly stated otherwise, “coupled” means that one element/node/feature can be mechanically, electrically, logically or otherwise connected with another element/node/feature in a direct or indirect manner to allow interaction, even though the two features may not be directly connected. That is, “coupled” is intended to comprise direct and indirect connection of components or other features, including connection using one or a plurality of intermediate components.

In addition, for reference purposes only, “first”, “second” and similar terms may also be used herein, and thus are not intended to be limitative. For example, unless the context clearly indicates, the words “first”, “second” and other such numerical words involving structures or elements do not imply a sequence or order.

It should also be noted that, as used herein, the words “include/comprise”, “contain”, “have”, and any other variations indicate that the mentioned features, entireties, steps, operations, elements and/or components are present, but do not exclude the presence or addition of one or a plurality of other features, entireties, steps, operations, elements, components and/or combinations thereof.

In the present disclosure, the term “provide” is used in a broad sense to cover all ways of obtaining an object, so “providing an object” includes but is not limited to “purchase", "preparation/manufacturing", "arrangement/setting", "installation/assembly", and/or "order" of the object, etc.

Those skilled in the art should realize that the boundaries between the above operations are merely illustrative. A plurality of operations can be combined into a single operation, which may be distributed in the additional operation, and the operations can be executed at least partially overlapping in time. Also, alternative embodiments may include a plurality of instances of specific operations, and the order of operations may be changed in various other embodiments. However, other modifications, changes and substitutions are also possible. Therefore, the Specification and attached drawings hereof should be regarded as illustrative rather than restrictive.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

The invention claimed is:

1. A phase shifter assembly, comprising:

a first printed circuit board;

a first wiper arm, which is rotatably coupled to the first printed circuit board;

a second printed circuit board;

a second wiper arm, which is rotatably coupled to the second printed circuit board;

a first drive rod which is coupled to the first wiper arm and the second wiper arm to drive the first wiper arm and the second wiper arm; and a first coupling element coupled to the first drive rod and bridged between the first wiper arm and the second wiper arm such that the first wiper arm is positioned between the first coupling element and the first printed circuit board and the second wiper arm is positioned between the first coupling element and the second printed circuit board, wherein the first printed circuit board and the second printed circuit board are arranged at a non-zero angle.

2. The phase shifter assembly according to claim 1, wherein the first drive rod is arranged adjacent to a side where the first printed circuit board and the second printed circuit board are closer to each other.

3. The phase shifter assembly according to claim 1, wherein the first drive rod is arranged on a side of the first printed circuit board facing away from the second printed circuit board, or arranged on a side of the second print circuit board facing away from the first printed circuit board.

4. The phase shifter assembly according to claim 1, wherein the first drive rod is arranged between the first printed circuit board and the second printed circuit board.

5. The phase shifter assembly according to claim 1, wherein the phase shifter assembly includes:

a second drive rod, which is coupled to the first wiper arm to drive the first wiper arm to rotate.

6. The phase shifter assembly according to claim 5, wherein the first drive rod is arranged on a side of the first printed circuit board facing away from the first printed circuit board; and the second drive rod is arranged on a side of the second printed circuit board facing away from the second printed circuit board.

7. The phase shifter assembly according to claim 5, wherein the phase shifter assembly includes:

a second coupling element, which is configured to couple the first wiper arm to the second drive rod.

8. The phase shifter assembly according to claim 1, wherein the first wiper arm and the second wiper arm are configured to rotate in unison.

9. The phase shifter assembly according to claim 1, wherein the phase shifter assembly includes:

a bracket including a first side portion and a second side portion arranged at an angle to each other, the first printed circuit board is fixed on the first side portion, and the second printed circuit board is fixed on the second side portion.

10. The phase shifter assembly according to claim 9, wherein the bracket is integrally formed.

11. The phase shifter assembly of claim 9, wherein the first side portion and the second side portion are combined to form the bracket.

12. The phase shifter assembly of claim 9, wherein the bracket is produced by punch forming or die-casting molding.

13. The phase shifter assembly according to claim 1, wherein the phase shifter assembly includes a cable channel residing between the first printed circuit board and the second printed circuit board, and the cable channel is configured to accommodate at least a part of a cable.

14. The phase shifter assembly of claim 1, wherein the phase shifter assembly is arranged in mirror symmetry.

15. The phase shifter assembly of claim 1, wherein the first printed circuit board and the second printed circuit board are arranged to be spaced apart from each other.

16. A base station antenna, including:

a reflector;

a plurality of radiating elements provided on a first side of the reflector; and the phase shifter assembly according to claim 1, the phase shifter assembly being provided on a second side of the reflector opposite to the first side.

17. The base station antenna according to claim 16, wherein the plurality of radiating elements include a plurality of high-band radiating elements and a plurality of low-band radiating elements; and the base station antenna further includes a cavity phase shifter;

wherein the cavity phase shifter is configured to be used for the plurality of high-band radiating elements, and the phase shifter assembly is configured to be used for the plurality of low-band radiating elements.

18. The base station antenna according to claim 16, wherein the phase shifter assembly includes a fixing portion configured to connect the phase shifter assembly to the reflector, and a first printed circuit board and a second printed circuit board of the phase shifter assembly are respectively arranged at an angle to the reflector.

19. A phase shifter assembly, comprising:

a first printed circuit board;

a first wiper arm, which is rotatably coupled to the first printed circuit board;

a second printed circuit board;

a second wiper arm, which is rotatably coupled to the second printed circuit board; and a first drive rod, which is coupled to the first wiper arm and the second wiper arm to drive the first wiper arm and the second wiper arm, wherein the first printed circuit board and the second printed circuit board are arranged at a non-zero angle, and wherein the first drive rod is arranged on a side of the first printed circuit board facing away from the second printed circuit board, or arranged on a side of the second printed circuit board facing away from the first printed circuit board.

* * * * *